(12) United States Patent
Yang

(10) Patent No.: US 9,274,727 B2
(45) Date of Patent: Mar. 1, 2016

(54) COMMUNICATION APPARATUS, CONTROL METHOD THEREFOR, AND COMPUTER-READABLE STORAGE MEDIUM FOR PERFORMING CONNECTION TO A PROCESSING TARGET APPARATUS

(71) Applicant: CANON KABUSHIKI KAISHA, Tokyo (JP)

(72) Inventor: Guowei Yang, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/667,733

(22) Filed: Mar. 25, 2015

(65) Prior Publication Data

US 2015/0286450 A1    Oct. 8, 2015

(30) Foreign Application Priority Data

Apr. 3, 2014   (JP) ................................. 2014-077260

(51) Int. Cl.
*G06F 15/00*    (2006.01)
*G06F 3/12*     (2006.01)
*G06K 1/00*     (2006.01)

(52) U.S. Cl.
CPC ............ *G06F 3/1236* (2013.01); *G06F 3/1203* (2013.01); *G06F 3/1292* (2013.01)

(58) Field of Classification Search
USPC .................................................. 358/1.1–1.15
See application file for complete search history.

(56) References Cited

U.S. PATENT DOCUMENTS

2012/0019864 A1* 1/2012 Mickeleit et al. ............ 358/1.15
2014/0211026 A1* 7/2014 Sakai ......................... 348/207.2

FOREIGN PATENT DOCUMENTS

JP    2010-093430    4/2010

* cited by examiner

*Primary Examiner* — Douglas Tran
(74) *Attorney, Agent, or Firm* — Fitzpatrick, Cella, Harper & Scinto

(57) ABSTRACT

It is determined whether a relay apparatus connected via a network is an external apparatus having a function of executing predetermined processing. In accordance with a determination result, the relay apparatus is registered as the external apparatus having the function of executing the predetermined processing.

22 Claims, 6 Drawing Sheets

| PRODUCT | MAC ADDRESS | MODEL NAME | SSID OF IMAGE FORMING APPARATUS |
|---|---|---|---|
| MG500 | A2-3C-FD-4B-C3-56 | MG500-series | 4BC356_MG500-series |
| MG300 | CA-DF-90-03-AC-4E | MG300-series | 03AC4E_MG300-series |

71 72 73 74

COMMUNICATION APPARATUS, CONTROL METHOD THEREFOR, AND COMPUTER-READABLE STORAGE MEDIUM FOR PERFORMING CONNECTION TO A PROCESSING TARGET APPARATUS

BACKGROUND OF THE INVENTION

1. Field of the Invention

The present invention relates to a communication technique of executing predetermined processing with an external apparatus connected via a network.

2. Description of the Related Art

In recent years, a wireless network using wireless communication has become widespread. Along with this, it is rapidly becoming popular to use image forming apparatuses such as a printer, multi-function peripheral, and digital camera via wireless communication instead of a wired network using a USB or wired communication.

In order for a wireless communication device to communicate with such image forming apparatus, for example, there are provided a method (infrastructure mode) of performing communication via an access point, and a method (ad hoc mode) of directly, wirelessly connecting the wireless communication device and the image forming apparatus.

Japanese Patent Laid-Open No. 2010-93430 discloses an arrangement of switching between the infrastructure mode and the ad hoc mode via given close proximity wireless communication without particularly interfering with communication in each mode.

According to Japanese Patent Laid-Open No. 2010-93430, it is possible to switch between the ad hoc mode and the infrastructure mode but switching does not start unless a close proximity connection between a wireless communication device and an image forming apparatus is established. That is, the mode of the image forming apparatus is not automatically determined, and needs to be determined by a user operation.

SUMMARY OF THE INVENTION

The present invention provides a communication technique capable of readily performing connection to a processing target apparatus.

To achieve the above object, a communication apparatus according to the present invention has the following arrangement. That is, there is provided a communication apparatus communicable with an external apparatus, comprising: a setting unit configured to set the external apparatus as a data transmission destination without displaying a selection screen for selecting the external apparatus if an access point used to communicate with the external apparatus is an access point of the external apparatus; and a display control unit configured to display the selection screen for selecting the external apparatus if the access point used to communicate with the external apparatus is not the access point of the external apparatus, wherein the setting unit sets, as a data transmission destination, the external apparatus selected using the selection screen.

According to the present invention, it is possible to provide a communication technique capable of readily performing connection to a processing target apparatus.

Further features of the present invention will become apparent from the following description of exemplary embodiments (with reference to the attached drawings).

DESCRIPTION OF THE EMBODIMENTS

Embodiments of the present invention will be described in detail below with reference to the accompanying drawings.

First Embodiment

Figure 1:
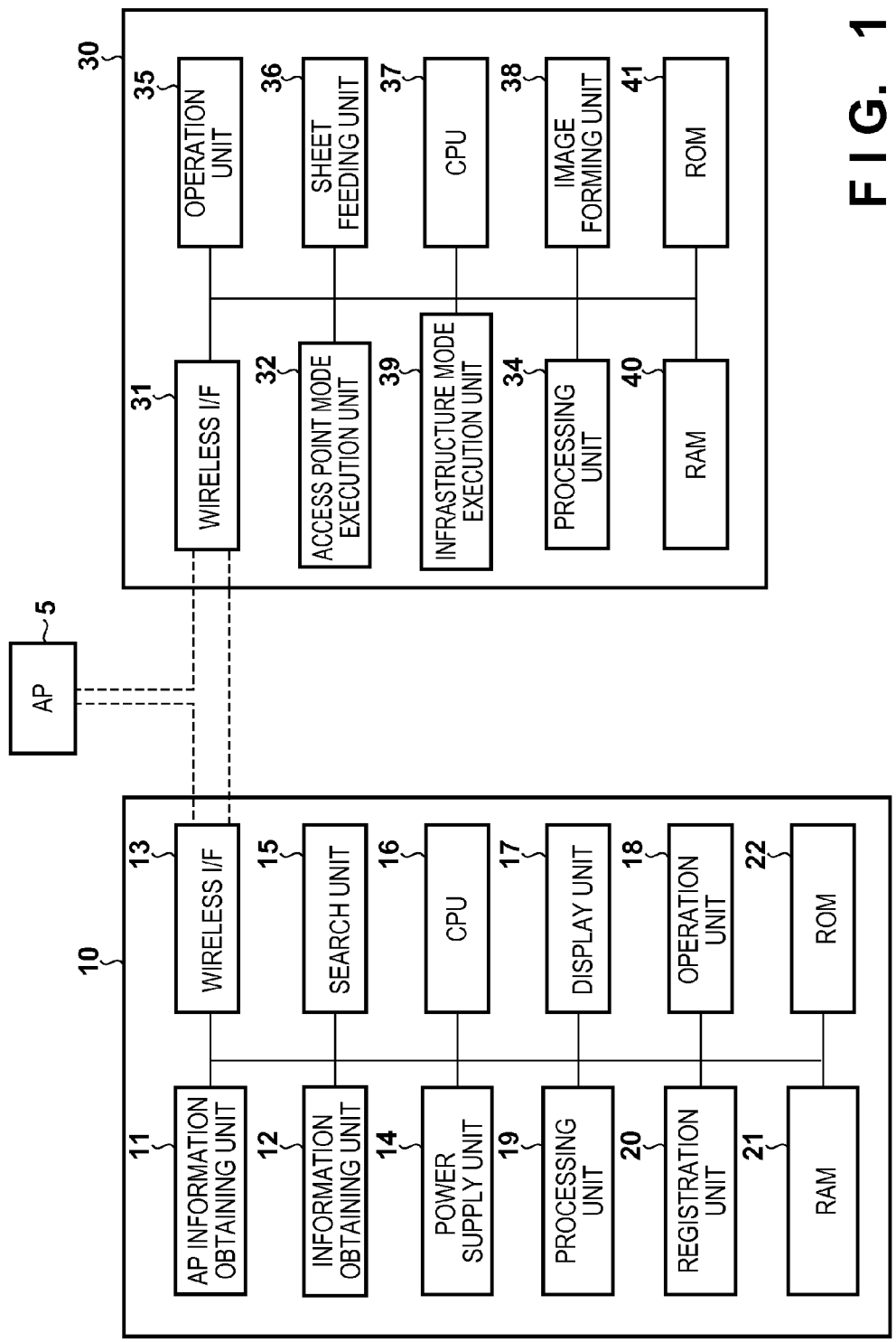
FIG. 1 is a block diagram showing the configuration of a wireless communication system.

A wireless communication system shown in FIG. 1 includes a wireless communication device 10, an access point (to be referred to as an AP hereinafter) 5 serving as a relay apparatus, and an image forming apparatus 30. The wireless communication device 10 can wirelessly communicate with another external apparatus (for example, the image forming apparatus 30) via the AP 5. Also, the wireless communication device 10 and image forming apparatus 30 can wirelessly communicate with each other without intervention of the AP 5. Note that FIG. 1 shows one AP 5. However, the number of APs 5 is not limited to this, and a plurality of APs 5 can be included. As described above, the wireless communication device 10, AP 5, and image forming apparatus 30 can create a wireless network in which these apparatuses wirelessly communicate with each other.

The wireless communication device 10 is an apparatus representing a tablet, a cellular phone, and the like. The wireless communication device 10 includes an AP information obtaining unit 11, an information obtaining unit 12, a wireless interface (I/F) 13, a power supply unit 14, a search unit 15, a CPU 16, a display unit 17, an operation unit 18, a processing unit 19, a registration unit 20, a RAM 21, and a ROM 22.

The AP information obtaining unit 11 obtains an SSID (Service Set Identifier) as the identification information of the AP 5. The image forming apparatus 30 has various kinds of information (device information) for identifying itself, and the information obtaining unit 12 can obtain the device information of the image forming apparatus 30. The wireless interface 13 is an interface for executing wireless communication. The power supply unit 14 is a power supply unit to the wireless communication device 10. The CPU 16 controls the wireless communication device 10, and calculates and processes data. The display unit 17 is formed from, for example, an LCD and the like, and displays various kinds of information.

The operation unit 18 accepts, from the user, operations for issuing various instructions to the wireless communication device 10. The processing unit 19 executes various processes implemented by the wireless communication device 10 in accordance with information instructed by the operation unit 18. The registration unit 20 registers the selected image forming apparatus 30 in the wireless communication device 10. The RAM 21 temporarily stores various kinds of information, and functions as a main memory or work area for the CPU 16. The ROM 22 stores programs to be read out by the CPU 16, and various data such as parameters. The CPU 16 can implement various processes (to be described later) by executing the programs stored in the ROM 22 on the RAM 21.

The image forming apparatus 30 includes a wireless interface (I/F) 31, an access point mode execution unit 32, a processing unit 34, an operation unit 35, a sheet feeding unit 36, a CPU 37, an image forming unit 38, an infrastructure mode execution unit 39, a RAM 40, and a ROM 41.

The wireless interface 31 is an interface for executing wireless communication. The access point mode execution unit 32 controls a mode in which the image forming apparatus 30 can perform direct connection (direct communication) to another wireless communication device without intervention of the AP 5 (an access point mode in which the image forming apparatus 30 functions as an access point). The infrastructure mode execution unit 39 controls a mode (infrastructure mode) in which the image forming apparatus 30 can communicate with another wireless communication device via the AP 5. Each of the AP mode and infrastructure mode can be turned on/off under the control of the CPU 37. When the infrastructure mode is ON, infrastructure connection is possible, and the image forming apparatus 30 can communicate with another wireless communication device via the AP 5. Alternatively, when the AP mode is ON, the image forming apparatus 30 can function as an AP to perform AP connection to another wireless communication device.

The processing unit 34 executes various processes implemented by the image forming apparatus 30 in accordance with information instructed by the operation unit 35. The operation unit 35 accepts operations for issuing various instructions to the image forming apparatus 30 from the user. The sheet feeding unit 36 stores sheets as printing media for printing, and feeds a designated sheet when the processing unit 34 transmits a sheet feeding instruction. The CPU 37 controls the image forming apparatus 30, and calculates and processes data. Based on data obtained from the processing unit 34, the image forming unit 38 prints an image on a sheet stored in the sheet feeding unit 36. Note that various printing methods such as an inkjet method and electrophotographic method can be used as a printing method in the image forming unit 38.

The AP 5 has the hardware arrangement of a general information processing apparatus. More specifically, the AP 5 includes a CPU, a ROM, a hard disk, a RAM, and various device controllers. The CPU executes a program such as an OS or application stored in a program ROM of the ROM or loaded from the hard disk into the RAM. The RAM functions as a main memory or work area for the CPU. The AP 5 also includes an input operation unit, a display unit, and a disk controller (DKC) which controls data access to an information storage unit. Furthermore, the AP 5 includes an I/F (interface) control unit which controls exchange or relay of data with a connected wireless communication device. The program executed by the CPU can obtain an input value from the input operation unit, and display various data on the display unit.

As described above, the AP 5 is assigned with an SSID as the identification information of the AP 5, and stores it. The SSID is used to identify the AP 5 when connecting the wireless communication device 10 and the AP 5. In the AP mode of the image forming apparatus 30 as well, an SSID for identifying the image forming apparatus 30 exists, similarly to the AP 5.

The arrangement of the SSID of the image forming apparatus 30 will be described with reference to FIG. 2. A product 71 indicates the name (apparatus name) of the image forming apparatus. The image forming apparatus 30 has various kinds of information including a MAC address 72 and a model name 73. The MAC address 72 is the MAC address of the image forming apparatus indicated by the product 71. The model name 73 indicates the model name of the image forming apparatus indicated by the product 71.

An SSID 74 set when the image forming apparatus 30 operates in the AP mode is obtained by, for example, concatenating the lower six digits of the MAC address 72 and the model name with an underscore "_". The SSID 74 is used for identification when the wireless communication device 10 is connected to the image forming apparatus 30. For example, in the example of FIG. 2, "MG300" of the product 71 has the MAC address 72 "CA-DF-90-03-AC-4E" and the model name 73 "MG300-series". Therefore, the SSID of "MG300" is "03AC4E_MG300-series". The arrangement of the SSID is merely an example, and it is not always necessary to adopt this rule. It is only necessary to form the SSID of the image forming apparatus according a predetermined rule (SSID arrangement rule) which allows the image forming apparatus 30 to be identified.

Print processing executed by the user using the wireless communication device 10 will be described with reference to a flowchart shown in FIG. 3. Note that a program corresponding to processing shown in the flowchart of FIG. 3 is stored in the ROM 22 of the wireless communication device 10. When the CPU 16 executes the program on the RAM 21, the processing shown in FIG. 3 is implemented.

Figure 4:
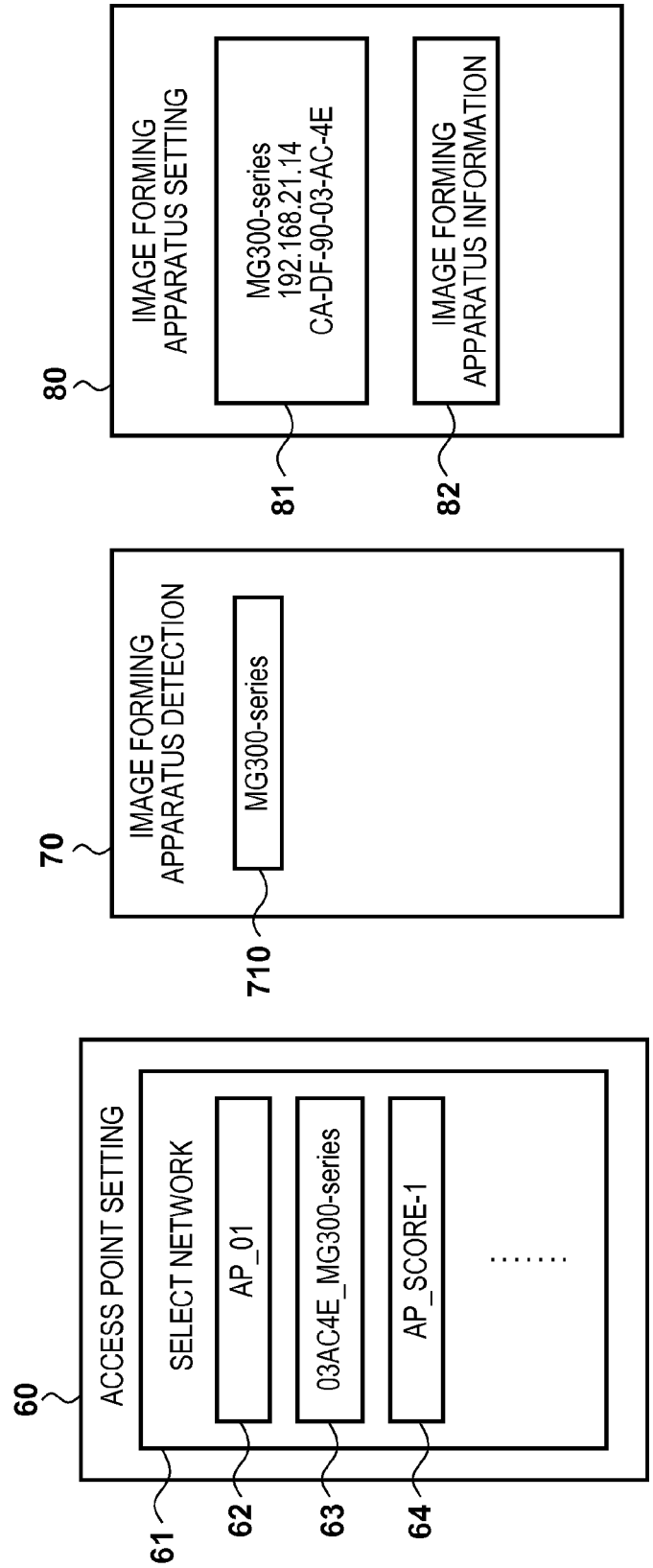
FIGS. 4A to 4C are views each showing an example of an operation screen.

First, the user powers on the wireless communication device 10. When the operation unit 18 accepts an operation of selecting an AP to be used by the user via an access point setting screen 60 shown in FIG. 4A and displayed on the display unit 17, the CPU 16 selects an AP according to the operation (S701). The access point setting screen 60 shown in FIG. 4A displays the SSIDs of APs 62 to 64 as a list of APs selectable in the wireless communication device 10. In this example, the AP 62 (whose SSID is "AP_01") and the AP 64 (whose SSID is "AP_SCORE-1") in FIG. 4A are general APs such as the AP 5. On the other hand, the AP 63 is, for example, an AP implemented when the image forming apparatus 30 operates in the AP mode, and has the SSID "03AC4E_MG300-series".

After selecting the AP, connection processing to the AP starts. After a connection is established, the CPU 16 activates an application for executing printing (S702). In response to a user operation, the CPU 16 selects, via the activated application, an image to be printed (S703). Upon accepting a print instruction from the user, the CPU 16 performs processing of automatically searching for image forming apparatuses, and confirms an image forming apparatus to be used to print the image (S704). The processing in S704 will be described in detail later with reference to a flowchart shown in FIG. 5. After the image forming apparatus to be used for printing is confirmed in the processing in S704, the CPU 16 prints the selected image by transmitting the selected image to the confirmed image forming apparatus via the selected AP as print processing (S705).

Figure 5:
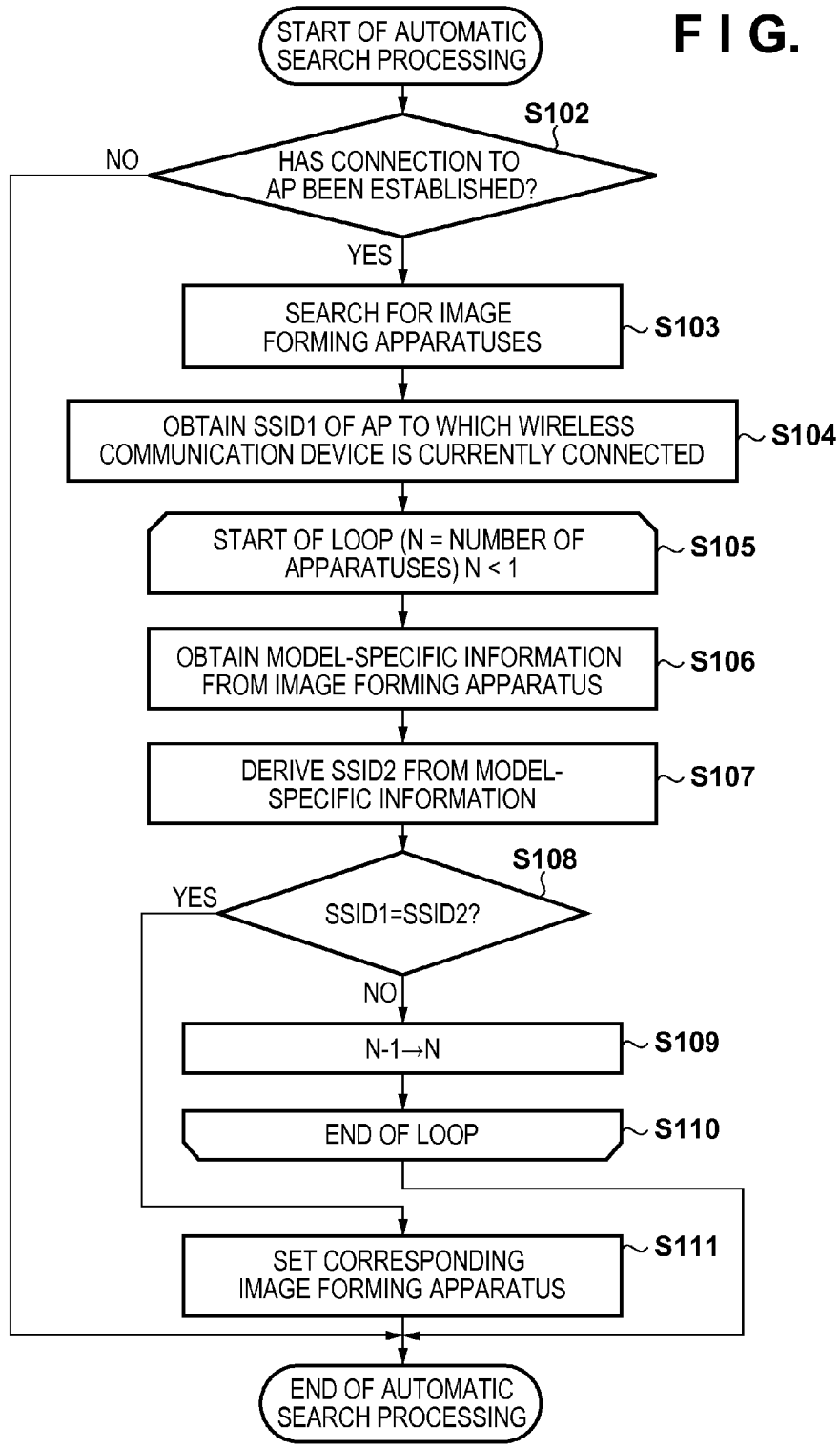
FIG. 5 is a flowchart illustrating processing of automatically searching for image forming apparatuses.

The processing of automatically searching for image forming apparatuses in S704 will be described in detail with reference the flowchart shown in FIG. 5. The processing of automatically searching for image forming apparatuses is processing of automatically registering, in the wireless communication device 10, an image forming apparatus to be used by the user via the wireless communication device 10. When the processing of automatically searching for image forming apparatuses starts, the CPU 16 determines whether a connection between the wireless communication device 10 and an AP has been established (S102). Note that the AP in this case includes an AP singly existing such as the AP 5, and an AP implemented by an image forming apparatus such as the image forming apparatus 30 which can implement an AP by the AP mode.

The image forming apparatus 30 cannot transmit/receive information to/from an external wireless communication device without intervention of an AP. It is, therefore, necessary to determine the connection state with the AP in S102. In this determination processing, the CPU 16 of the wireless communication device 10 transmits a determination processing command to the processing unit 19, and the processing unit 19 determines the connection state with the AP. The determination method changes depending on the concrete type of the wireless communication device and the OS installed in the wireless communication device.

If it is determined that no connection to the AP has been established, that is, the wireless communication device 10 is not currently connected to the AP (NO in S102), the process ends. On the other hand, if it is determined that a connection to the AP has been established (YES in S102), the CPU 16 searches for image forming apparatuses via the AP, and obtains the number of image forming apparatuses connected to the AP to which the wireless communication device 10 is currently connected (S103).

The CPU 16 causes the AP information obtaining unit 11 to obtain the SSID (the SSID of the connected AP is set as SSID 1 (first identification information)) of the AP to which the wireless communication device 10 is currently connected (S104). The CPU 16 sets the number of image forming apparatuses found in S103 in a variable N, and repeatedly executes loop processing in S106 to S110 by the variable N (S105). If no image forming apparatus is found in S103, that is, the number of image forming apparatuses is 0, the process exits the loop processing, thereby terminating the process. If one or more image forming apparatuses are found, the process advances to S106 to start the loop processing.

The CPU 16 selects a processing target image forming apparatus from the image forming apparatuses found in S103, and causes the information obtaining unit 12 to obtain model-specific information of the selected image forming apparatus (S106). The obtained model-specific information of the image forming apparatus contains the MAC address 72 and model name 73 shown in FIG. 2.

The CPU 16 derives the SSID (this SSID is set as SSID 2 (second identification information)) of the image forming apparatus using the model-specific information (the MAC address 72 and model name 73) obtained in S106 according to the SSID arrangement rule when the image forming apparatus operates in the AP mode.

The CPU 16 compares SSID 2 derived in S107 with SSID 1 obtained in S104, and determines whether the SSIDs coincide with each other (S108). The coincidence of SSID 1 and SSID 2 indicates that the AP to which the image forming apparatus is currently connected is the same as that implemented by the AP mode of the found image forming apparatus. That is, the AP to which the wireless communication device 10 is currently connected can be determined as the AP implemented by the AP mode of the found image forming apparatus. If it is determined that SSID 1 coincides with SSID 2 (YES in S108), the CPU 16 can determine that the wireless communication device 10 is currently connected to the AP implemented by the AP mode of the image forming apparatus. That is, the CPU 16 can determine, as an image forming apparatus to be used, the image forming apparatus having the model-specific information from which it is possible to derive the same SSID as that of the AP to which the wireless communication device 10 is currently connected in S108. Thus, the CPU 16 exits the loop processing, and sets the image forming apparatus as an image forming apparatus to be used by the user (S111). In this case, in order to perform communication between the wireless communication device 10 and the image forming apparatus, the CPU 16 registers, in the registration unit 20, setting information including the model-specific information of the image forming apparatus. The process then ends.

On the other hand, if it is determined that SSID 1 does not coincide with SSID 2 (NO in S108), the CPU 16 determines that the wireless communication device 10 is not currently connected to the AP implemented by the AP mode of the processing target image forming apparatus. The CPU 16 decrements the variable N by 1 to select the next processing target image forming apparatus (S109). For example, SSID 2 derived from the model-specific information of an image forming apparatus operating in the infrastructure mode does not coincide with SSID 1 obtained from an AP singly existing in the network.

A practical example will be described below. In the access point setting screen 60 shown in FIG. 4A, the user first selects an AP to be used. Note that the wireless communication device 10 can present APs selectable by the user and their SSIDs on the access point setting screen 60 by obtaining information of currently connectable APs using the CPU 16 and processing unit 19. As described above, the SSIDs of the APs 62 and 64 shown in FIG. 4A indicate general APs, and the SSID of the AP 63 of the image forming apparatus indicates an AP implemented by the AP mode of the image forming apparatus. Assume that the user selects the AP 63 of the image forming apparatus.

In the conventional method, the user needs to perform a procedure of executing detection processing implemented by an image forming apparatus detection screen 70 shown in FIG. 4B, and selecting an image forming apparatus 710 operating in the AP mode and detected by the detection processing. Even though the number of image forming apparatuses operating in the AP mode and found by the detection processing is one in most cases, the user needs to select the found one image forming apparatus 710 ("MG300-series") in FIG. 4B. After the user selects the SSID assigned to the image forming apparatus operating in the AP mode, and then the processing unit 19 of the wireless communication device 10 sets setting information about the selected image forming apparatus, an image forming apparatus setting screen 80 including the setting information shown in FIG. 4C is displayed. The setting screen 80 shown in FIG. 4C displays, as an example of the setting information, information 81 including the model name, IP address, and MAC address of the image forming apparatus, and information (image forming apparatus information) 82 about the remaining image forming apparatuses.

To the contrary, in the first embodiment, when the AP 63 ("MG300-series") of the image forming apparatus is selected in the access point setting screen 60, it is not necessary to select the same image forming apparatus as the found one in the image forming apparatus detection screen 70.

As described above, according to the first embodiment, when a wireless communication device is connected to an image forming apparatus operating in the AP mode, it is possible to automatically register the image forming apparatus in the wireless communication device without additionally searching for the image forming apparatus. In this manner, it is possible to establish a communication environment between the image forming apparatus and the wireless communication device without requiring the user to designate the image forming apparatus in addition to selection of an AP.

Second Embodiment

In the second embodiment, the difference from the first embodiment is the arrangement of the SSID of an image forming apparatus 30 in the AP mode. In the second embodiment, a case in which an arbitrary identifier is assigned as the SSID of the image forming apparatus 30 in the AP mode will be exemplified. As an example, assume that the SSID of the image forming apparatus 30 operating in the AP mode is "CANONAP_XXXXX". In this case, "CANONAP" is an identifier (connection mode information), and is used to determine whether a predetermined connection mode is the AP mode. The designated identifier need not always be "CANONAP", and any character string capable of specifying that the image forming apparatus 30 operates in the AP mode may be used. Also, "_XXX" including an underscore following the identifier may be an arbitrary character string. A wireless communication device 10 can obtain the SSID from the image forming apparatus 30 as its information.

Figures 2, 3:
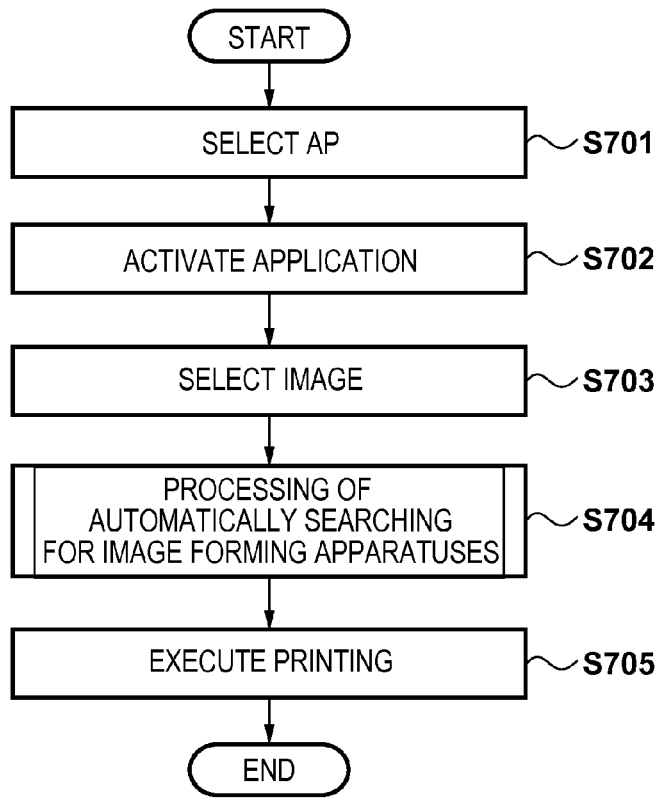
FIG. 2 is a table showing the arrangement of an SSID of an image forming apparatus in an AP mode.
FIG. 3 is a flowchart illustrating print processing executed by the image forming apparatus.
Figure 6:
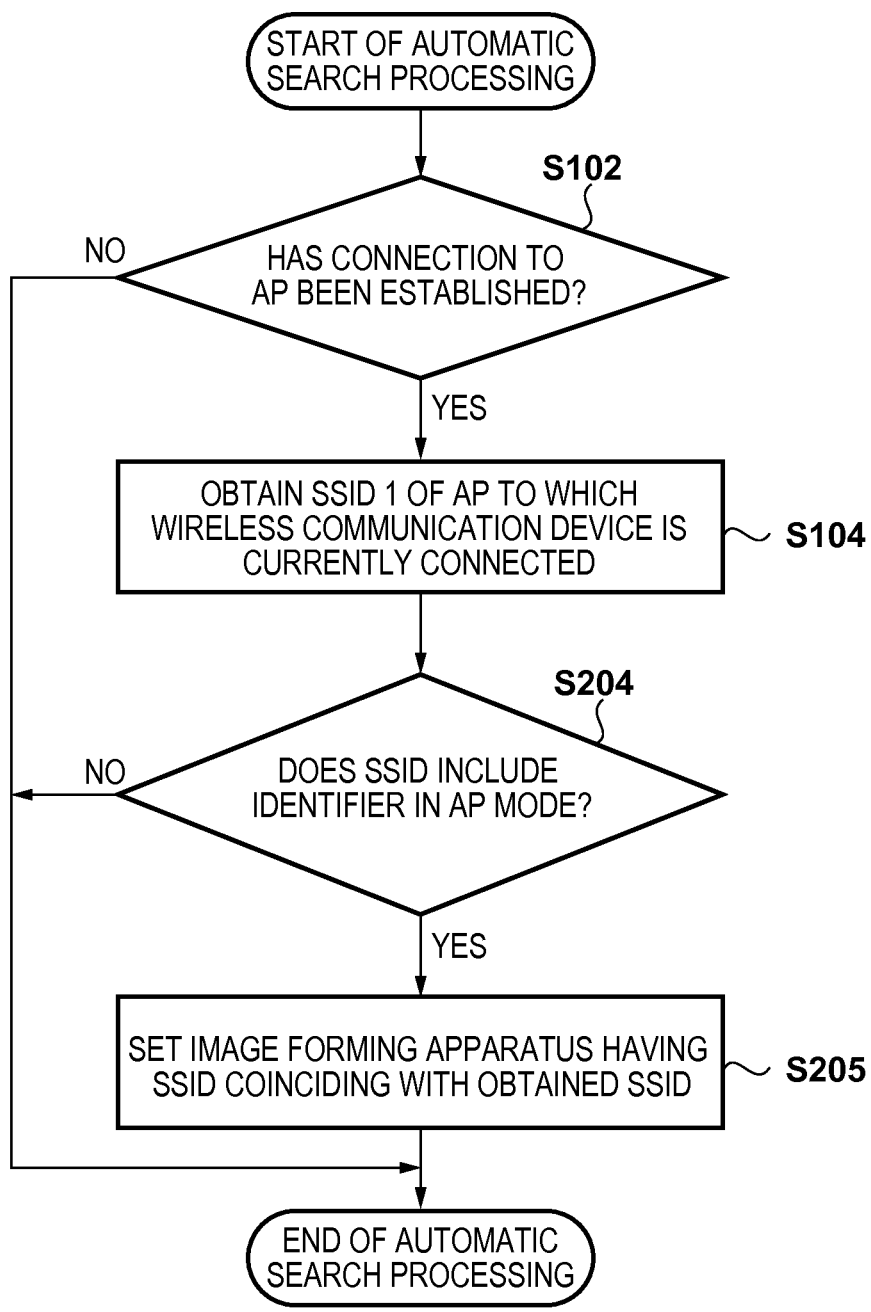
FIG. 6 is a flowchart illustrating processing of automatically searching for image forming apparatuses.

Print processing implemented according to the second embodiment is the same as that in the first embodiment except for processing (S704) of automatically searching for image forming apparatuses in FIG. 3 of the first embodiment. The processing (S704) of automatically searching for image forming apparatuses according to the second embodiment will be described in detail with reference to FIG. 6. Note that the same step numbers as those in FIG. 3 of the first embodiment denote the same processes and a detailed description thereof will be omitted.

After processes in S102 and S104, a CPU 16 determines whether the character string of the SSID includes the identifier of the image forming apparatus in the AP mode (S204). If the identifier in the AP mode is included (YES in S204), the CPU 16 can determine that the AP to which the wireless communication device 10 is currently connected is an AP implemented by the AP mode of the image forming apparatus. In this case, the CPU 16 can determine that the wireless communication device 10 is currently connected to the image forming apparatus operating in the AP mode. Therefore, the CPU 16 searches for an image forming apparatus having an SSID coinciding with the obtained SSID from image forming apparatuses found via the AP to which the wireless communication device 10 is currently connected, and sets the found image forming apparatus as an image forming apparatus to be used by the user (S205). The processing in S205 is executed by assuming a case in which another image forming apparatus is currently connected to the AP of the image forming apparatus. For example, if three image forming apparatuses are connected to the AP of the image forming apparatus, the wireless communication device 10 can find the three image forming apparatuses via the currently connected AP in addition to the image forming apparatus (whose SSID is "CANONAP_XXXXX"). The processing in S205 is executed to automatically set the image forming apparatus (whose SSID is "CANONAP_XXXXX") among the found image forming apparatuses.

More specifically, in the processing in S205, the CPU 16 first searches for image forming apparatuses via the AP to which the wireless communication device 10 is currently connected. The CPU 16 then obtains SSIDs (second identification information) from all the found image forming apparatuses. Lastly, the CPU 16 compares the SSIDs obtained from the image forming apparatuses with the SSID (first identification information) obtained in S104, and sets the image forming apparatus having the SSID coinciding with that obtained in S104 as an image forming apparatus to be used by the user. Thus, the CPU 16 registers setting information including the model-specific information of the set image forming apparatus in the registration unit 20 to perform communication between the wireless communication device and the image forming apparatus. The process then ends.

On the other hand, if the identifier in the AP mode is not included (NO in S204), it can be determined that the wireless communication device 10 is not currently connected to an AP implemented by the AP mode of the image forming apparatus, thereby terminating the process.

As described above, according to the second embodiment, similarly to the effects described in the first embodiment, the wireless communication device and the image forming apparatus operating in the AP mode can be automatically, wirelessly connected to each other without requiring the user to perform an operation of selecting the image forming apparatus.

Third Embodiment

In the third embodiment, a case in which an information obtaining unit 12 of a wireless communication device 10 obtains the current connection mode information of an image forming apparatus 30 from the image forming apparatus 30 will be described. The connection mode information is information indicating whether the image forming apparatus 30 performs communication via an AP included in itself (AP mode) or performs communication via an external AP (infrastructure mode).

Note that the image forming apparatus 30 can generate connection mode information indicating a connection mode (the AP mode or infrastructure mode) in which the image forming apparatus 30 currently operates, and register the information in a RAM 40. In response to a request from an external device (the wireless communication device 10 or an AP 5), the image forming apparatus 30 can output the information about itself including the connection mode information.

Figure 7:
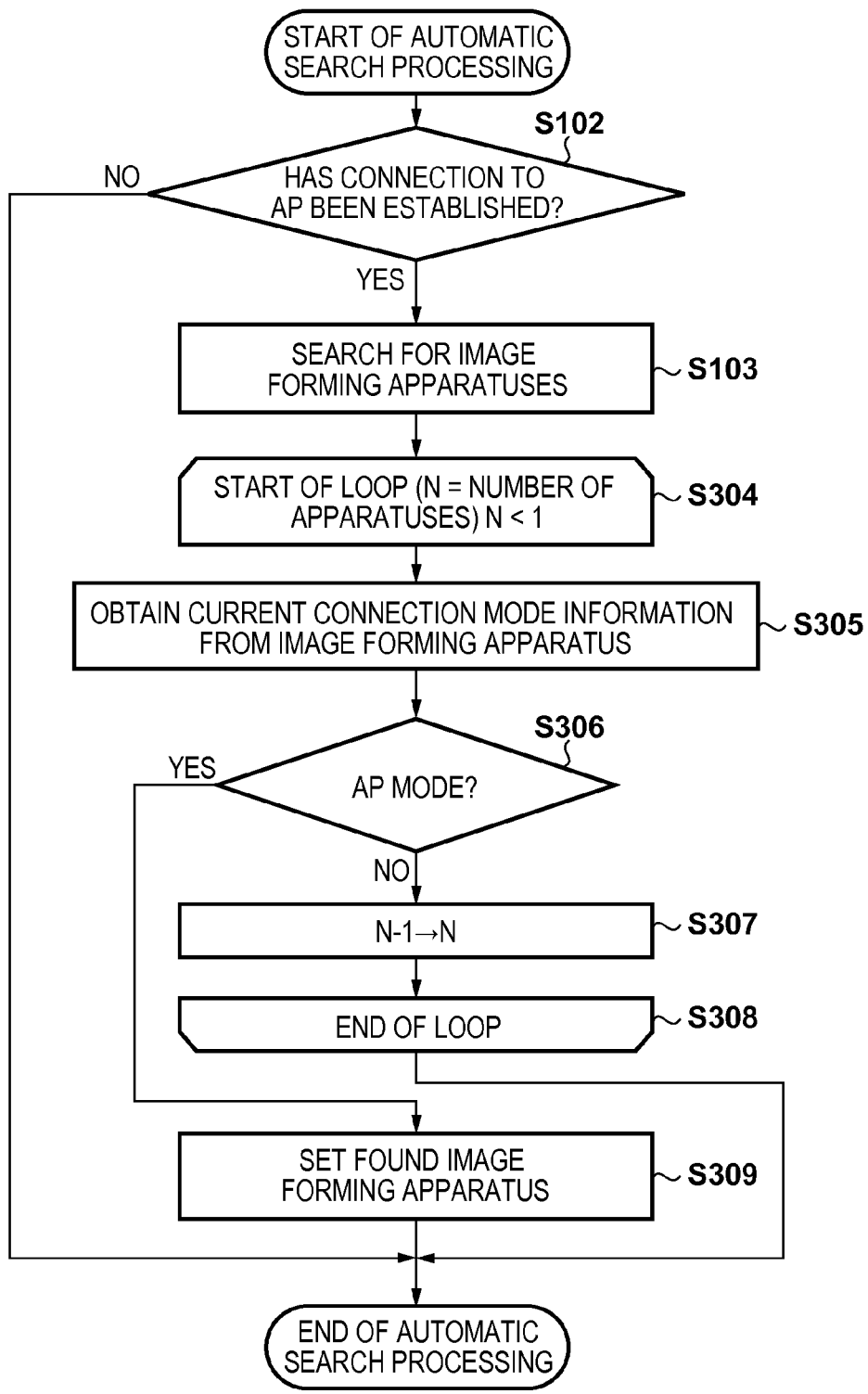
FIG. 7 is a flowchart illustrating processing of automatically searching for image forming apparatuses.

Print processing implemented according to the third embodiment is the same as that in the first embodiment except for processing (S704) of automatically searching for image forming apparatuses shown in FIG. 3 of the first embodiment. The processing (S704) of automatically searching for image forming apparatuses according to the third embodiment will be described in detail with reference to FIG. 7. Note that the same step numbers as those in FIG. 3 of the first embodiment denote the same processes and a detailed description thereof will be omitted.

After processes in S102 and S103, a CPU 16 sets the number of image forming apparatuses found in S103 in a variable N, and repeatedly executes loop processing in S305 to S308 (S304). If no image forming apparatus is found in S103, that is, if the number of image forming apparatuses is 0, the CPU 16 exits the loop processing, thereby terminating the process. If one or more image forming apparatuses are found, the process advances to S305 to start the loop processing.

The CPU 16 selects a processing target image forming apparatus from the image forming apparatuses found in S103, and causes an information obtaining unit 12 to obtain the information of the selected image forming apparatus (S305). In this example, the information includes connection mode information.

Based on the connection mode information obtained in S305, the CPU 16 determines whether the connection mode of the image forming apparatus is the AP mode. If the connection mode is the AP mode (YES in S306), it can be determined that the wireless communication device 10 is currently connected to an AP implemented by the AP mode of the image forming apparatus. Therefore, the CPU 16 exits the loop processing, and sets the image forming apparatus as an image forming apparatus to be used by the user (S309).

On the other hand, if the connection mode is not the AP mode (NO in S306), it is determined that the processing target image forming apparatus is not in the AP mode, and the value of the variable N is decremented by 1 to select the next processing target image forming apparatus (S307).

As described above, according to the third embodiment, similarly to the effects described in the first and second embodiments, the wireless communication device and the image forming apparatus operating in the AP mode can be automatically, wirelessly connected to each other without requiring the user to perform an operation of selecting the image forming apparatus.

Fourth Embodiment

In the aforementioned first to third embodiments, a case in which the wireless communication device is connected to the image forming apparatus having the AP function, and the image forming apparatus prints an image has been exemplified. The present invention, however, is not limited to this. The processes described in the first to third embodiments may be applied to an external apparatus having the AP function (relay function) of implementing predetermined processing (for example, image reading, FAX transmission, and the like) with a wireless communication device. For example, if a wireless communication device obtains an image via an AP implemented by a scanner apparatus, each of the aforementioned embodiments is applicable.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-077260, filed Apr. 3, 2014, which is hereby incorporated by reference wherein in its entirety.

What is claimed is:

1. A communication apparatus communicable with an external apparatus, comprising:
an accepting unit configured to accept an access point in accordance with an instruction to an access point setting screen concurrently displaying plural access points;
a setting unit configured to set the external apparatus as a data transmission destination without displaying a selection screen for selecting the external apparatus if the accepted access point used to communicate with the external apparatus is an access point of the external apparatus; and
a display control unit configured to display the selection screen for selecting the external apparatus if the accepted access point used to communicate with the external apparatus is not the access point of the external apparatus,
wherein said setting unit sets, as a data transmission destination, the external apparatus selected using the selection screen.

2. The apparatus according to claim 1, further comprising:
a determination unit configured to determine, based on information received from the access point, whether the access point used to communicate with the external apparatus is the access point of the external apparatus.

3. The apparatus according to claim 2, wherein based on identification information for identifying the access point, said determination unit determines whether the access point used to communicate with the external apparatus is the access point of the external apparatus.

4. The apparatus according to claim 2, wherein if information received from the access point includes information indicating that the external apparatus currently operates in a communication mode for performing connection to said communication apparatus using the access point of the external apparatus, said determination unit determines that the access point used to communicate with the external apparatus is the access point of the external apparatus.

5. The apparatus according to claim 1, wherein the external apparatus is a printing apparatus.

6. A control method for a communication apparatus communicable with an external apparatus, comprising:
accepting an access point in accordance with an instruction to an access point setting screen concurrently displaying plural access points;
setting the external apparatus as a data transmission destination without accepting selection of the external apparatus from a user if the accepted access point used to communicate with the external apparatus is an access point of the external apparatus; and
displaying a selection screen for selecting the external apparatus if the accepted access point used to communicate with the external apparatus is not the access point of the external apparatus,
wherein the external apparatus selected using the selection screen is set as a data transmission destination,
wherein the accepting, setting, and displaying are performed by the communication apparatus.

7. The method according to claim 6, further comprising:
determining, based on information received from the access point, whether the access point used to communicate with the external apparatus is the access point of the external apparatus, wherein the determining is performed by the communication apparatus.

8. The method according to claim 7, wherein based on identification information for identifying the access point, it is determined in the determination whether the access point used to communicate with the external apparatus is the access point of the external apparatus.

9. The method according to claim 6, further comprising displaying a screen for selecting the access point,
wherein the displaying of the screen for selecting the access point is performed by the communication apparatus.

10. The method according to claim 6, wherein the external apparatus is a printing apparatus.

11. A non-transitory computer-readable storage medium storing a program for causing a computer to control a communication apparatus communicable with an external apparatus, the program causing the computer to function as
an accepting unit configured to accept an access point in accordance with an instruction to an access point setting screen concurrently displaying plural access points;
a setting unit configured to set the external apparatus as a data transmission destination without accepting selection of the external apparatus from a user if the accepted access point used to communicate with the external apparatus is an access point of the external apparatus, and
a display control unit configured to display a selection screen for selecting the external apparatus if the accepted access point used to communicate with the external apparatus is not the access point of the external apparatus,
wherein the setting unit sets, as a data transmission destination, the external apparatus selected using the selection screen.

12. The medium according to claim 11, wherein the program further causes the computer to function as a determination unit configured to determine, based on information received from the access point, whether the access point used to communicate with the external apparatus is the access point of the external apparatus.

13. The medium according to claim 11, wherein based on identification information for identifying the access point, the determination unit determines whether the access point used to communicate with the external apparatus is the access point of the external apparatus.

14. The medium according to claim 12, wherein if information received from the access point includes information indicating that the external apparatus currently operates in a communication mode for performing connection to the communication apparatus using the access point of the external apparatus, the determination unit determines that the access point used to communicate with the external apparatus is the access point of the external apparatus.

15. The medium according to claim 11, wherein the external apparatus is a printing apparatus.

16. A control method for a communication apparatus communicable with an external apparatus, comprising:
communicating with the external apparatus; and
transmitting print data without accepting selection of the external apparatus from a user if the external apparatus being communicating with communication apparatus currently operates in a communication mode for communicating with the communication apparatus using an access point of the external apparatus,
wherein the communicating and transmitting are performed by the communication apparatus.

17. The method according to claim 16, wherein the communication mode is an AP mode.

18. The method according to claim 16, wherein the external apparatus is a printing apparatus.

19. The method according to claim 16, wherein the communication apparatus is wirelessly connected to the external apparatus.

20. The method according to claim 16, further comprising displaying a screen for selecting the access point,
wherein the print data is transmitted without accepting the selection of the external apparatus from the user if the access point selected by using the screen is the access point of the external apparatus, and
wherein the displaying is performed by the communication apparatus.

21. The apparatus according to claim 1, further comprising a phone unit.

22. The method according to claim 16, the communication apparatus comprising a phone unit.

* * * * *